United States Patent Office 2,710,761
Patented June 14, 1955

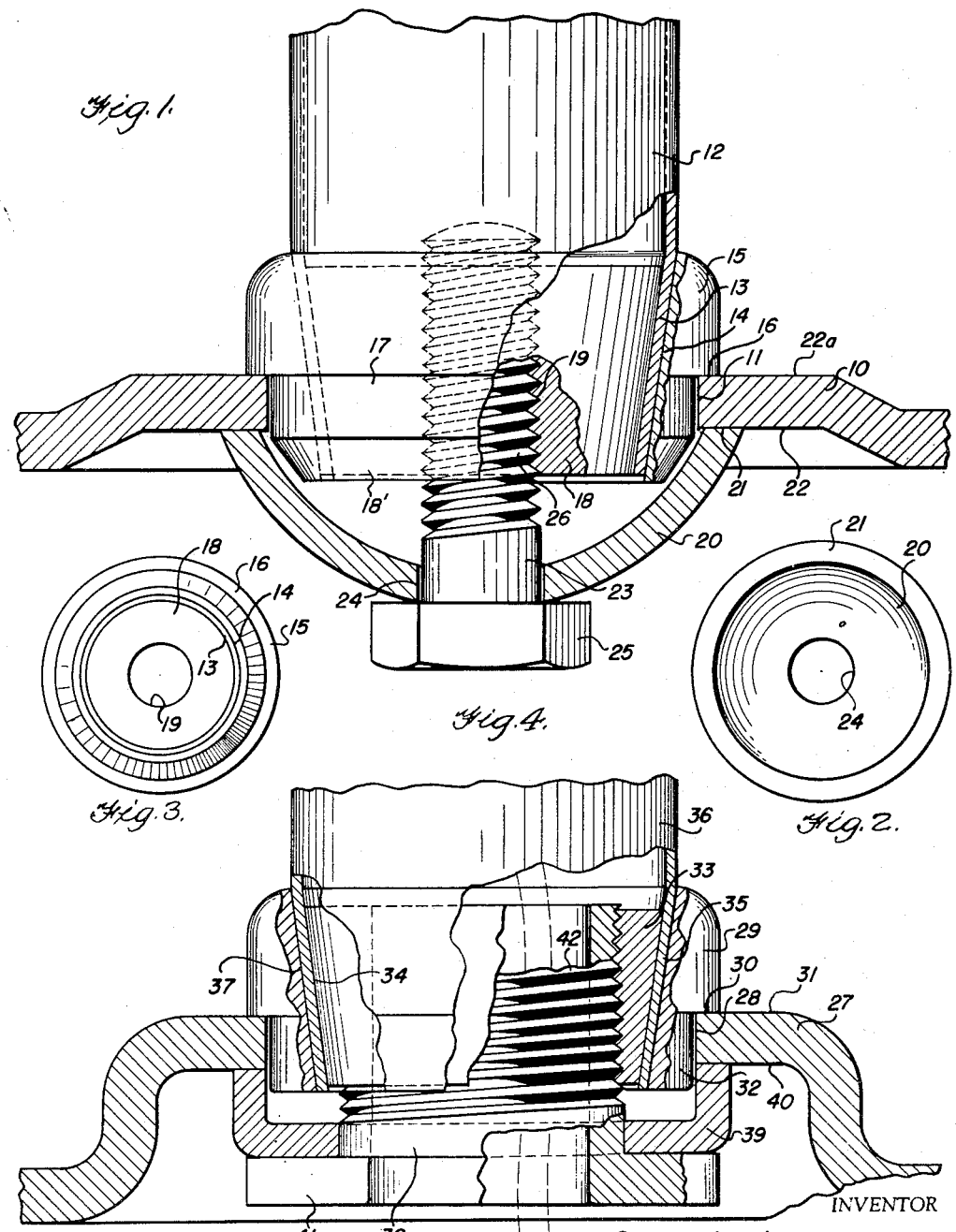

2,710,761
ADAPTOR RING

Otto L. Lagervall, Yakima, Wash.

Application March 31, 1950, Serial No. 153,215

1 Claim. (Cl. 287—20)

This invention relates to an adaptor ring, and has for one of its objects the production of a simple and efficient means for holding thin-walled tubes to bases or other flat surfaces, without the necessity of cutting threads in the tubes.

A further object of this invention is the production of a simple and efficient means for anchoring the end of a tube to a base, with no continuation of the tube beyond the base.

Other objects and advantages of the present invention will appear throughout the following specification and claim.

In the drawing:

Figure 1 is a side elevational view of the adaptor, certain parts thereof being shown in section, the base also being shown in section;

Figure 2 is a top plan view reduced in size, of the cup washer looking at the concave face thereof;

Figure 3 is a bottom plan view reduced in size, of the adaptor ring, tapering wedge filler, and showing the end of the pipe in interfitting relation;

Figure 4 is a vertical sectional view of a modified form of the invention, certain parts being shown in elevation.

By referring to the drawing in detail, it will be seen that 10 designates the base or other flat supporting surface, having a pipe receiving aperture 11 formed therein. A thin-walled pipe 12 of the conventional type is provided with a tapering end 13 which fits into the tapering aperture 14 of the adaptor ring 15. The adaptor ring 15 encircles the tapered end 13 of the thin-walled pipe 12, preferably for the entire length of the tapering end 13 thereof, as shown in Figure 1. The adaptor ring is provided with an annual flat abutment shoulder 16 which rests upon the upper face of the base 10, and also is provided with a depending annular portion 17 below the shoulder 16, which annular portion 17 is inset from the outer periphery of the ring 15 and is of a reduced diameter relative to the ring 15. The depending annular portion 17 of the ring 15 preferably is provided with a tapering portion 18' at its lower end to facilitate the insertion of the ring 15 into the aperture 11 of the base 10.

An inverted cone-like or tapering wedge filler 18 fits snugly in the lower tapered end 13 of the pipe 12 to clamp the thin tapering end 13 of the pipe 12 into tight frictional clamping engagement with the wall of the tapering aperture 14 of the ring 15. This filler or plug 18 is provided with a centrally located internally threaded aperture 19 which extends entirely through the filler or plug 18. It will be noted by considering Figure 1, that the shoulder 16 of the ring 15 rests upon the upper or outer face of the base or support 10, and a rigid hard metal cup washer 20 which is concavo-convex abuts the bottom or outer face 22 of the base or support 10. The cup washer 20 is provided with a hollow body portion and a flat contact periphery 21 which periphery is adapted to snugly fit against the face 22 of the base or support 10. A tightening bolt 23 extends through the central aperture 24 of the cup washer 20, the head 25 of the bolt 23 abutting the washer 20, as shown in Figure 1. The bolt 23 is provided with external threads 26 which are threaded into the internally threaded aperture 19.

As the bolt 23 is threaded into the aperture 19, the wedge filler 18 acts as a frictional nut which is drawn into wedging engagement with the inner face of the tapering end 13 of the pipe 12. This action binds the tapering end 13 of the thin-walled pipe 12 into frictional gripping engagement with the wall of the tapering aperture 14 of the ring 15. Since the bolt 23 extends through the cup-washer 20, the pipe 12 will be firmly locked in the ring 15, the ring 15 will be firmly clamped against the face 22ᵃ of the base or support 10, and the edge 21 of the cup-washer 20 will be firmly clamped against the bottom or outer face 22 of the base or support 10. In this way, the end of the pipe 12 will be sealed or closed and also firmly anchored in position upon the support 10.

In Figure 4, there is shown a modified form of the invention wherein a base or support is indicated as 27, having a suitable aperture 28. An adaptor ring 29 is carried by the base or support 27 and is provided with an annular abutment shoulder 30 which fits snugly against the face 31 of the base or support 27 and overhangs the aperture 28 in a manner similar to that shown in Figure 1. The ring 29 is provided with an inset annular depending portion 32 which fits into the aperture 28. An internally threaded filler 33 having a tapering outer wall or face 34 fits snugly within the tapered end 35 of the thin-walled pipe 36. The tapered end 35 fits snugly against the tapering wall of the aperture 37 of the ring 29.

A hollow pull-down nut or bolt 38 extends through a rigid hard metal shallow cup-washer 39, which washer encases the depending portion 32, is provided with a hollow body portion and abuts the face 40 of the base or support 27. The nut 38 is provided with a suitable head 41 which head 41 abuts the washer 39. The hollow nut 38 is provided with external threads 42, which engage the threads of the internally threaded filler or wedge clamp 33. The hollow pull-down nut 38 is provided in the form shown in Figure 4 to permit electric cables to be inserted up through the tube 36, for use in lamps, etc.

As the nut 38 is tightened, the tapered end 35 will be tightly drawn into the tapering aperture 37 of the adaptor ring 29, and the head 41 of the pull-down nut 38 will be firmly clamped against the washer 39. The washer 39 will in turn be firmly clamped against the face 40 of the base or support 27.

It should be noted that the shape and size of the adaptor will necessarily depend upon its use, the load it is required to sustain, the material used, etc. By merely eliminating the filler 18, the structure shown in Figure 1 may be used to hold solid rods, merely by threading the bolt 23 into the end of the rod, within the scope of the invention. Furthermore, it should be noted that other detail changes may be employed well within the scope of the invention, so long as these changes fall within the scope of the appended claim.

Having described the invention, what I claim as new is:

A device of the class described comprising a flat support having an aperture, an adaptor ring having a portion thereof fitting in said aperture, said ring having a flat abutment shoulder abutting said support adjacent said aperture, a thin-walled tube having a tapered end fitting in said ring, a tapering plug fitting in said tapered end of the tube for firmly holding said tapered end of said tube in engagement with said ring, said ring encircling said tapered end of said tube and plug, a hard metal cup-washer having a flat support contacting periphery contacting the opposite face of said support with respect to said ring, said contacting periphery surrounding said aperture, the cup-washer comprising a hollow concavo-convex body portion spaced from said ring and plug, and a threaded bolt engaging said plug and the hollow concavo-convex body portion of said washer for tightly fastening said ring and washer in clamping engagement with said support.

References Cited in the file of this patent

UNITED STATES PATENTS

| | | |
|---|---|---|
| 511,359 | Ragovcy | Dec. 26, 1893 |
| 587,546 | Dillenburg | Aug. 3, 1897 |
| 739,589 | Clifford | Sept. 22, 1903 |
| 1,102,079 | Rizer | June 30, 1914 |
| 1,696,861 | Plimpton | Dec. 25, 1928 |
| 2,065,902 | Levin | Dec. 29, 1936 |
| 2,345,910 | Fawcett | Apr. 4, 1944 |
| 2,480,791 | Valerius | Aug. 30, 1949 |

FOREIGN PATENTS

| | | |
|---|---|---|
| 2,117 | Great Britain | of 1893 |
| 16,061 | Switzerland | of 1898 |
| 841,576 | France | of 1939 |